United States Patent Office 2,737,769
Patented Mar. 13, 1956

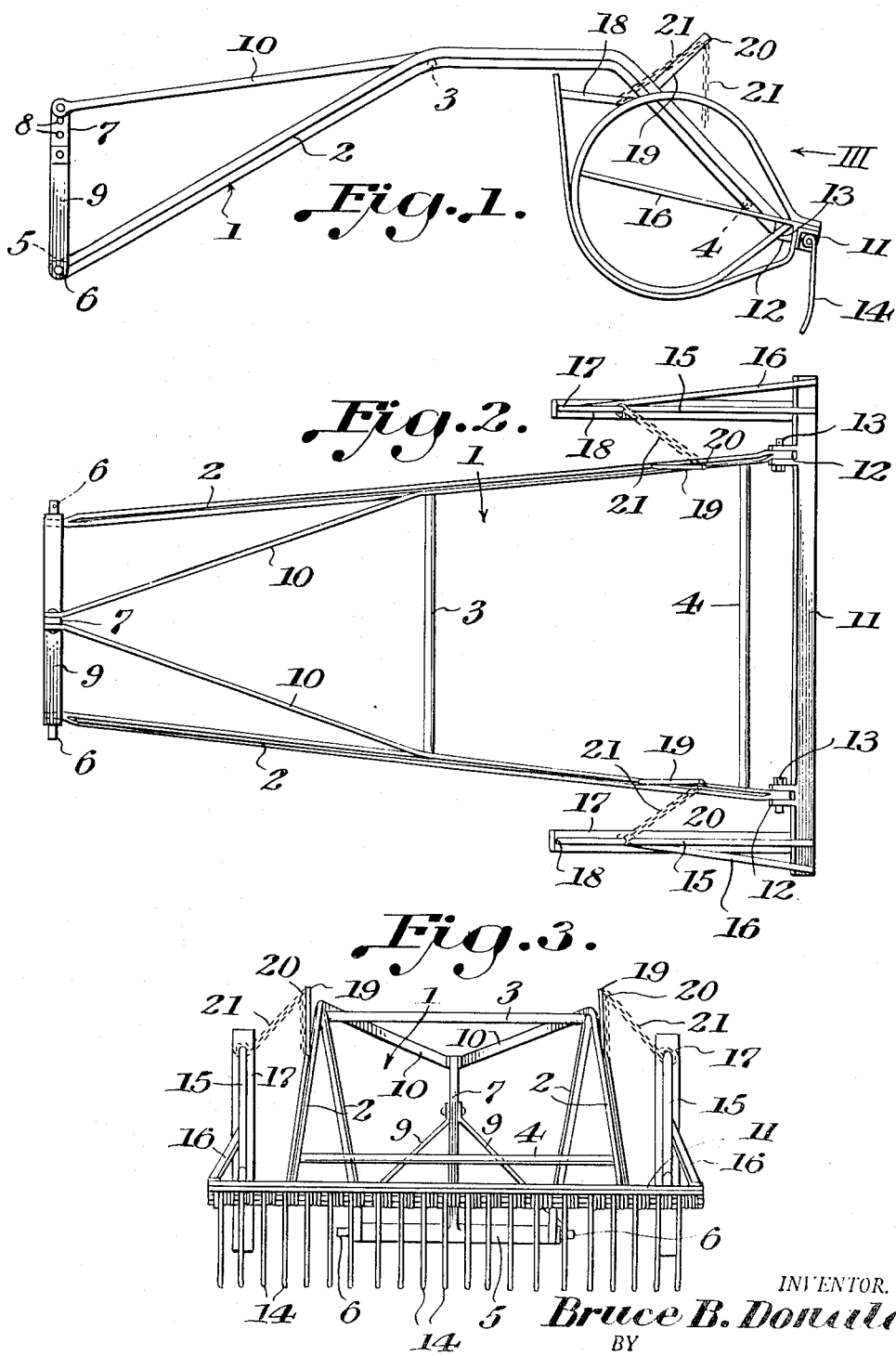

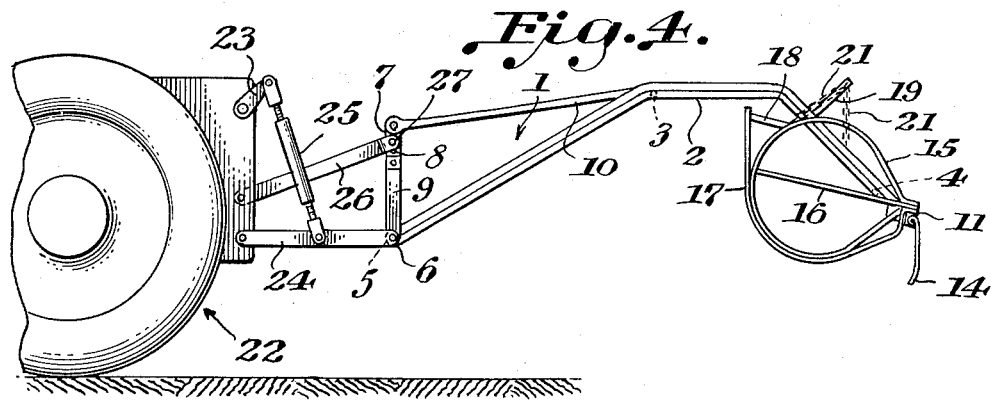
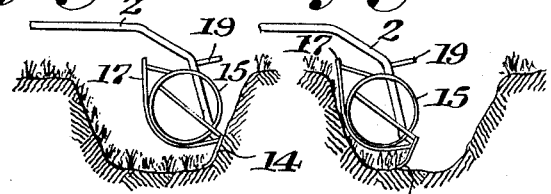 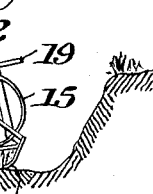 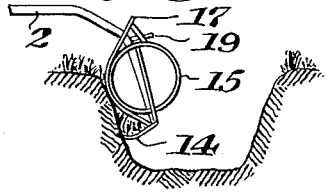
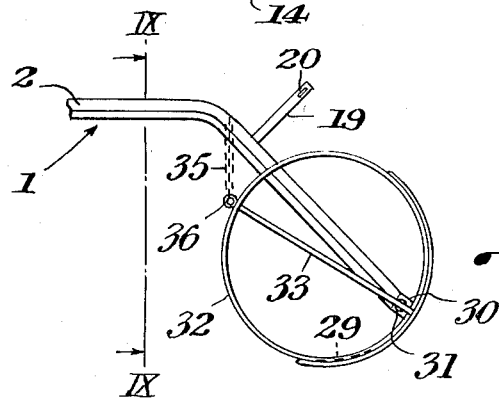
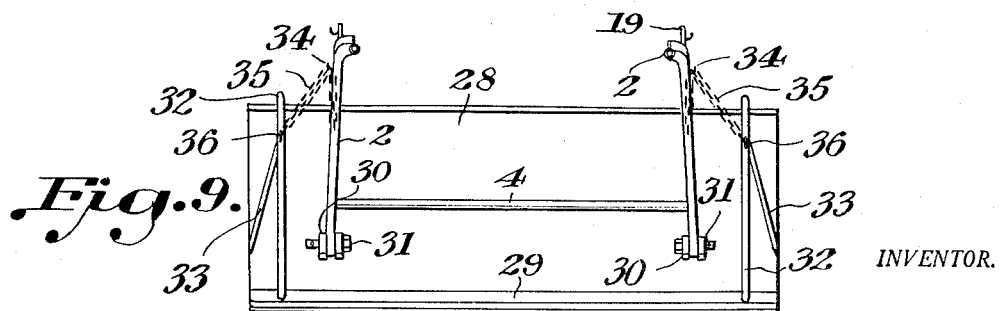

2,737,769

IMPLEMENT FOR USE IN CLEARING OR CLEANING DRAINS OR DITCHES

Bruce Buchanan Donald, Featherston, New Zealand

Application March 25, 1952, Serial No. 278,470

Claims priority, application New Zealand April 4, 1951

7 Claims. (Cl. 56—27)

The invention relates to an implement for use in clearing or cleaning drains and ditches.

One of the objects of the invention is to provide an implement consisting of few parts and constructed such-wise as to enable weed growth and rubbish in drains or ditches to be cleared away in a highly efficient manner and without necessity for frequent stoppages.

A further object of the invention is to provide, for the purpose referred to, an implement which is quickly and easily adapted for connection to a tractor or like power-operated vehicle so that, with the aid of the implement, the operation of clearing weed growth from drains or ditches, or cleaning the same by the removal of mud and debris, can be carried out under the control of the driver of the vehicle.

According to one aspect of the invention, the implement comprises a jib adapted for upward and downward swinging movement, a crossbar pivotally connected to the jib, tines carried by the cross bar and adapted to engage with weed growth or debris in a drain or ditch, and shoes also carried by the cross-bar, the shoes being so shaped that when the tines are drawn across the drain or ditch from one bank thereof to the other by movement of the jib in a direction away from the drain or ditch, they will engage with the second-mentioned bank and act not only to cant the tines in a direction for retaining the weed growth or debris, but will also prevent the tines from digging into this bank and at the same time guide them out of the drain or ditch.

According to another aspect of the invention, the implement comprises a jib having one end adapted for pivotal connection to a power-operated vehicle so that the other end of the jib can be be swung upwardly and downwardly by power supplied from the vehicle, a grader or scraper blade pivotally connected to this other end of the jib, and adapted to engage with mud and rubbish in a drain or ditch, and shoes carried by said blade and so shaped that when the blade is drawn across the drain or ditch from one bank thereof to the other by movement of the jib in a direction away from the drain or ditch, the shoes will engage with the second bank and act not only to cant the blade in a direction for retaining the mud and rubbish, but also to guide the blade out of the drain or ditch.

The invention will now be more fully explained with reference to the accompanying drawings, in which:

Figure 1 is a side elevational view of one form of the implement of the invention, suitable for application to a tractor fitted with a hydraulic lift;

Figure 2 is a plan view corresponding to Figure 1;

Figure 3 is a rear end view looking in the direction of the arrow III in Figure 1;

Figure 4 is a view similar to that of Figure 1 but to a smaller scale, showing the implement connected to hydraulic lift mechanism of a tractor;

Figures 5, 6 and 7 are fragmentary side elevational views to a still smaller scale, showing how the implement according to the preceding figures operates in the clearing of a drain or ditch;

Figure 8 is a fragmentary side elevational view illustrating a modification, the view being drawn to the same scale as that of Figure 1 to 3, and Fig. 9 is a cross-sectional view on the line IX—IX of Figure 8.

The implement illustrated in Figures 1 to 7 comprises a jib generally indicated at 1. The jib has side arms 2 of substantially arched formation as depicted more clearly in Figures 1 and 4, the side arms being spaced apart and diverging from each other in the direction of the rear end of the jib 1 so that the latter is narrower at its forward end than at its rearward end. The arms 2 are connected by a stretcher-bar 3 arranged approximately midway between their ends, and by a further stretcher-bar 4 arranged near their rearward ends. The arms 2 are made from metal tubes to the upper edges of which metal ribbing or feathering is secured, thereby endowing the arms with great strength consistent with lightness in weight.

The forward ends of the arms 2 are connected to a transversely disposed bar 5 having trunnion pins 6 at its ends. To the bar there is secured an upwardly extending and centrally disposed post 7 having holes 8 formed in its upper end portion. The post 7 is reinforced by diagonally disposed braces 9 extending between the post and the bar 5. To the upper end of the post there are connected stays 10 which extend to and are secured to the side arms 2.

Adjacent the rear ends of the side arms 2 of the jib 1 there is provided a cross-bar 11 which extends laterally beyond the side arms and is formed with lugs 12 to which the rear ends of the side arms are pivotally connected by means of removable pins 13. The cross-bar carries a plurality of depending spring tines 14.

Shoes are carried by the cross-bar 11, the shoes being comprised of two hoops 15 which are secured to the cross-bar 11 and are arranged one on either side of and spaced from the side arms 2. The hoops extend forwardly of the cross-bar and are strengthened by struts 16 joined to the forward bends of the hoops and to the cross-bar. To the hoops 15 there are secured skid plates 17 which pass around the lower bends of the hoops and have forward end portions projecting upwards tangentially from the hoops, and rearward end portions extending also tangentially from the hoops and joined to the cross-bar 11. The forward end portions of the skid plates are held against bending by stays 18 connected between these portions and the hoops 15.

Upwardly and rearwardly extending arms 19 are secured to the rear end portions of the side arms 2 of the jib and are provided at their upper ends with hooks 20. Tethers in the form of lengths of chain 21 are hitched round the stays 18 at their point of junction with the hoops 15, and are engaged with the hooks 20, thereby holding the hoops, with their skid plates 17, in a desired vertical position relatively to the jib 1. By varying the point at which the chains 21 are engaged with the hooks 20, the vertical setting of the hoops 15 and their skid plates 17 can be varied at choice. It will be appreciated that as the hoops 15 are joined at their rearward bends to the cross-bar 11 and the latter is pivotally connected to the rear ends of the side arms 2 of the jib 1, variation in the vertical setting of the hoops by means of the chains 21 will result in a variation of the angle at which the tines 14 depend relatively to the jib 1.

Figure 4 depicts how the implement constructed as described in the foregoing is connected to a tractor 22 the rear end of which is fitted with a hydraulic lift of known form comprising an upper pair of power-operated lever-arms 23, a lower pair of links 24 pivotally secured to the tractor framework, adjustable toggles 25 pivotally connected to the outer ends of the lever arms 23 and to the links 24 intermediate the ends of the latter, and a single stretcher-bar 26 also pivotally secured to the tractor framework between the lever arms 23 and links 24. The outer ends of the links 24 are pivotally engaged over the trunnion pins 6 of the bar 5 of the implement, while the outer end of the stretcher bar 26 is connected to the post 7 by means of a pivot pin 27 which is passed through one of the holes 8. When thus attached to the tractor 22, the jib can be raised and lowered, somewhat after the manner of the jib of a crane, by operation of the hydraulic mechanism of the tractor.

To use the implement when attached to a tractor as described, the tractor is put in reverse and driven backwards toward the drain or ditch to be cleared, until the tines 14 lie over the remote bank of the drain or ditch. The jib 1 is now lowered so that the tines move down this bank and then come to rest in the bottom of the drain as depicted in Figure 5. The tractor is now driven forward so that the tines move across the bottom of the drain and tear away vegetation growing there and take hold of loose material as depicted in Figure 6. Forward driving of the tractor is continued, with the result that the skid plates 17 on the hoops 15 will engage with the near bank of the drain, causing the hoops to swing rearwardly about the axis of the pivot pins 13, as depicted in Figure 7. Such swinging movement will cause the tines 14 to be canted forwardly so that they will retain the material gathered from the bottom of the drain. The sections of the chains 21 extending between the hooks 20 and hoops 15 are initially so set for length that while they will swing rearwardly with rearward movement of the hoops, they will limit the degree of rearward movement of the hoops to such an extent that the skid plates 17 will still project to some extent forwardly of the rear end portions of the side arms 2 of the jib 1. Thus, besides rearward swinging movement of the hoops causing the tines 14 to be canted for the purpose described, the skid plates, by engaging with the near bank of the drain, will serve the three-fold purpose of keeping the tines in a position for tearing away vegetation growing on this bank, preventing the tines from digging into the earth in the bank, and guiding the tines up over the bank on to the side land with a corresponding lifting of the jib, all these effects being produced merely by the process of driving the tractor forwardly, that is to say, without special manipulation of the jib. When the tines have arrived at the top of the near bank, the hydraulic mechanism of the tractor is operated to raise the jib still further, the result being that, under the weight of the rubbish carried by the tines the hoops 15 will swing forwardly to their initial position, thus causing the tines to return to a substantially vertical position so that the rubbish collected will fall from the tines and be deposited on to the side land. The implement is then ready for the next clearing step.

In the modification illustrated in Figure 8 and 9, the jib is of the same form as that described with reference to Figures 1 to 7 and the same reference numerals are used to indicate like parts of the jib in so far as such parts are shown in Figures 8 and 9.

According to the modification, there is provided as an adjunct to the jib and in substitution for the cross-bar 11 and the parts carried by it in the construction first described, a grader or scraper blade 28. This blade is shaped to conform to part of a cylinder extending transversely of the jib 1, the concave face of the blade facing the forward end of the jib. The lower longitudinal edge portion of the blade may be sharpened or, as shown, fittted with a sharpened reinforcing piece 29.

The concave face of the blade 28 is fitted with lugs 30 between which are engaged the rear ends of the side arms 2 of the jib 1, these ends being pivotally secured to the lugs by means of removable pins 31.

To the concave face of the blade there is also secured two shoes in the form of hoops 32 which are arranged near the lateral edges of the blade and extend in the direction of the forward end of the jib 1. The hoops are held firmly in position by means of struts 33 extending from the forward bends of the hoops to the blade 28.

The side arms 2 of the jib are provided with hooks 34 arranged above the forward bends of the hoops 32 and tethers in the form of lengths of chain 35 are engaged with these hooks and also with eyes 36 provided on the hoops. These chains serve a similar purpose as the chains 21 in the construction according to Figures 1 to 7, namely, they enable the initial position in elevation of the shoes 32 relatively to the jib to be varied with consequent variation in the initial angle of inclination of the blade 28.

The appliance when constructed as described with reference to Figures 8 and 9 functions in substantially the same manner as that described with reference to the other figures. Whereas the cross-bar and tine assembly in the first embodiment is used mainly for clearing away vegetation from drains or ditches, the scraper or grader blade assembly in the second embodiment is better suited for clearing away mud, loose rubbish or obstinate roots, so as to give a clean finish to the drain or ditch after the tines have served their purpose or where weed growth is not excessive.

Since the same form of jib 1 is suited for use with both forms of clearing or cleaning accessories described in the foregoing, it is possible to supply the user with the one jib and the two accessories so that either one of the latter can be employed at choice.

What I do claim and desire to obtain by Letters Patent of the United States of America is:

1. An implement for application to a tractor having power-operated lifting mechanism, to enable drains or ditches to be cleared or cleaned, said implement comprising a jib having spaced side arms of substantially arched formation, a transversely disposed bar to which the forward ends of said side arms are secured, a post secured to and extending upwardly from said bar, stays extending between and secured to said post and said side arms, a transversely disposed digging tool connected for rotation about a horizontal axis to the rear ends of the side arms, shoes secured to the digging tool extending forwardly and downwardly from the axis of said digging tool to the level of the end thereof and then curving forwardly and upwardly, the shoes thus being free to swing upwardly and downwardly and guide said digging tool, means attached to said side arms and said shoes means for limiting the degree of downward swinging movement of said shoes, and means on said transversely disposed bar and on said post enabling said implement to be pivotally connected to power-operated lifting mechanism on a tractor so that the jib can be raised and lowered.

2. An implement for application to a tractor having power-operated lifting mechanism, to enable ditches or drains to be cleared or cleaned, said implement comprising a jib having spaced side arms of substantially arched formation, a transversely disposed bar to which the forward ends of said side arms are secured, a post secured to and extending upwardly from said bar, means acting to reinforce the post, stays extending between and secured to said post and said side arms, a cross-bar connected for rotation about a horizontal axis to the rear ends of the side arms, a plurality of downwardly projecting tines secured to said cross-bar, shoes secured to said cross-bar extending forwardly and downwardly from said cross-bar to the level of the ends of said tines and then curving forwardly and upwardly, the shoes being thus free to swing upwardly and downwardly and guide said tines, means on said side arms and said shoes for limiting the degree of downward swinging movement of said shoes, and means on said transversely disposed bar at the forward end of the side arms and on the post on said bar to enable said implement to be pivotally connected to power-operated lifting mechanism on a tractor so that the jib can be raised and lowered.

3. An implement as claimed in claim 2 wherein said shoes comprise forwardly directed hoops secured to and extending below the cross-bar and upwardly curved skid plates secured to the lower bends of the hoops.

4. An implement as claimed in claim 2 wherein the means for limiting the degree of downward swinging movement of the shoes comprise chains secured to the shoes and engageable with hooks supported on the side arms of the jib.

5. An implement for application to a tractor having power-operated lifting mechanism, to enable drains or ditches to be cleared or cleaned, said implement comprising a jib having spaced side arms of substantially arched formation, a transversely disposed bar to which the forward ends of said side arms are secured, a post secured to and extending upwardly from said bar, stays extending between and secured to said post and side arms, a transversely disposed scraper-blade connected for rotation about a horizontal axis to the rear ends of the side arms, shoes secured to said scraper-blade extending forwardly and downwardly from said scraper-blade to the level of the end of said blade and then curving forwardly and upwardly, said shoes thus being free to swing upwardly and downwardly and guide said blade, means on said side arm for limiting the degree of downward swinging movement of the shoes, and means on said transversely disposed bar and the post thereon to enable said implement to be pivotally connected to power-operated lifting mechanism on a tractor so that the jib can be raised and lowered.

6. An implement as claimed in claim 5 wherein the shoes comprise forwardly directed hoops secured to the forward face of the scraper blades.

7. An implement as claimed in claim 5 wherein the means for limiting the degree of downward swinging movement of the shoes comprise chains secured to the shoes and engageable with hooks on the side arms of the jib.

References Cited in the file of this patent

UNITED STATES PATENTS

| | | |
|---|---|---|
| 228,631 | Hand | June 8, 1880 |
| 735,257 | Hodgins | Aug. 4, 1903 |
| 1,843,809 | Dumbolton | Feb. 2, 1932 |
| 2,050,133 | Smith | Aug. 4, 1936 |
| 2,295,850 | King | Sept. 15, 1942 |
| 2,378,280 | Bomford | June 12, 1945 |
| 2,634,516 | Morkoski et al. | Apr. 14, 1953 |